United States Patent
Cheon et al.

(10) Patent No.: US 8,837,400 B2
(45) Date of Patent: Sep. 16, 2014

(54) METHOD OF TRANSMITTING SMALL AMOUNT OF UPLINK DATA AND METHOD OF RECEIVING SMALL AMOUNT OF UPLINK DATA

(75) Inventors: Kyung Yul Cheon, Daejeon (KR); You Sun Hwang, Seoul (KR); Kwang Ryul Jung, Daejeon (KR); Ae Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 13/335,444

(22) Filed: Dec. 22, 2011

(65) Prior Publication Data

US 2012/0163296 A1     Jun. 28, 2012

(30) Foreign Application Priority Data

Dec. 23, 2010   (KR) .................. 10-2010-0133310

(51) Int. Cl.
*H04W 72/04*          (2009.01)
(52) U.S. Cl.
USPC ........................................ 370/329; 370/252
(58) Field of Classification Search
USPC ................................................. 370/252, 329
See application file for complete search history.

(56) References Cited

U.S. PATENT DOCUMENTS

| | | | | |
|---|---|---|---|---|
| 6,091,954 | A * | 7/2000 | Haartsen et al. | 455/447 |
| 7,123,590 | B2 * | 10/2006 | Mir et al. | 370/252 |
| 7,308,268 | B2 * | 12/2007 | Barbosa da Torre et al. | 455/446 |
| 7,430,177 | B2 * | 9/2008 | Mir et al. | 370/241 |
| 8,219,088 | B2 * | 7/2012 | Yeoum et al. | 455/435.1 |
| 8,391,239 | B2 * | 3/2013 | Tenny et al. | 370/331 |
| 8,437,358 | B2 * | 5/2013 | Shin et al. | 370/415 |
| 2006/0203738 | A1 * | 9/2006 | Fok et al. | 370/252 |
| 2006/0274667 | A1 * | 12/2006 | Mir et al. | 370/252 |
| 2008/0085719 | A1 * | 4/2008 | Kuchibhotla et al. | 455/452.1 |
| 2009/0109878 | A1 * | 4/2009 | Liu et al. | 370/259 |
| 2009/0201864 | A1 | 8/2009 | Ahluwalia | |
| 2010/0120455 | A1 | 5/2010 | Aghili et al. | |
| 2010/0291939 | A1 * | 11/2010 | Jen et al. | 455/450 |
| 2010/0303009 | A1 * | 12/2010 | Liu | 370/328 |
| 2011/0028120 | A1 * | 2/2011 | Wu | 455/404.1 |
| 2012/0044897 | A1 * | 2/2012 | Wager et al. | 370/329 |
| 2012/0149386 | A1 * | 6/2012 | Kumar et al. | 455/452.2 |
| 2012/0282956 | A1 * | 11/2012 | Kim et al. | 455/466 |
| 2013/0022015 | A1 * | 1/2013 | Jung et al. | 370/329 |
| 2013/0210384 | A1 * | 8/2013 | Zhang | 455/410 |
| 2013/0336330 | A1 * | 12/2013 | Hedman et al. | 370/401 |

FOREIGN PATENT DOCUMENTS

| | | |
|---|---|---|
| KR | 1020070074933 | 7/2007 |
| KR | 1020080098652 | 11/2008 |

* cited by examiner

*Primary Examiner* — Jay P Patel
(74) *Attorney, Agent, or Firm* — Nelson Mullins Riley & Scarborough, LLP (57) ABSTRACT

Disclosed is a method of transmitting and receiving a small amount of uplink data. A method of transmitting uplink data includes detecting uplink data to be transmitted, determining whether or not uplink data transmission is necessary only once, transmitting a service request message including information instructing that a data radio bearer not be generated when it is determined that uplink data transmission is necessary only once, starting a radio resource control (RRC) connection setup process, and performing the uplink data transmission once using a signaling radio bearer without generating the data radio bearer with reference to the information instructing that the data radio bearer not be generated, during the RRC connection setup process, when it is determined that \ uplink data transmission is necessary only once.

9 Claims, 6 Drawing Sheets

| Information Element | Presence | Format | Length | |
|---|---|---|---|---|
| Protocol discriminator | M | V | 1/2 | |
| Security header type | M | V | 1/2 | |
| KSI and sequence number | M | V | 1 | |
| Message authentication code(short) | M | V | 2 | |
| No Data Bearer Flag | O | T | 1 | 610 |

FIG. 7

| Information Element/<br>Group name | Need | Multi | Semantics description |
|---|---|---|---|
| ... | ... | ... | |
| DedicatedInfoNAS | Optional | | NAS Dedicated information | ~710

FIG. 8

| Information Element | Presence | Format | Length |
|---|---|---|---|
| Protocol discriminator | M | V | 1/2 |
| Security header type | M | V | 1/2 |
| EMM Application Data | M | TLV | | ~810

METHOD OF TRANSMITTING SMALL AMOUNT OF UPLINK DATA AND METHOD OF RECEIVING SMALL AMOUNT OF UPLINK DATA

CLAIM FOR PRIORITY

This application claims priority to Korean Patent Application No. 10-2010-0133310 filed on Dec. 23, 2010 in the Korean Intellectual Property Office (KIPO), the entire contents of which are hereby incorporated by reference.

BACKGROUND

1. Technical Field

Example embodiments of the present invention relate in general to transmission and reception of uplink data and more specifically to a method of transmitting and receiving uplink data, which is suitable and efficient to transmit and receive a small amount of uplink data in an application such as machine type communication in a 3GPP Long Term Evolution (LTE)-Advanced system.

2. Related Art

In a conventional 3GPP LTE-Advanced system, a radio bearer includes a signaling radio bearer (SRB) for signal processing communication of each control entity such as radio resource control (RRC) or enhanced mobility management (EMM) and a data radio bearer (DRB) for user data transmission. An SRB1 is generated by an RRC connection setup process, and then an SRB2 and a DRB are generated by an RRC reconfiguration process.

That is, in the conventional 3GPP LTE/LTE-Advanced system, a terminal in an idle state can transmit an uplink packet after performing the RRC connection setup process and the RRC reconfiguration process for DRB setup.

Figure 1:
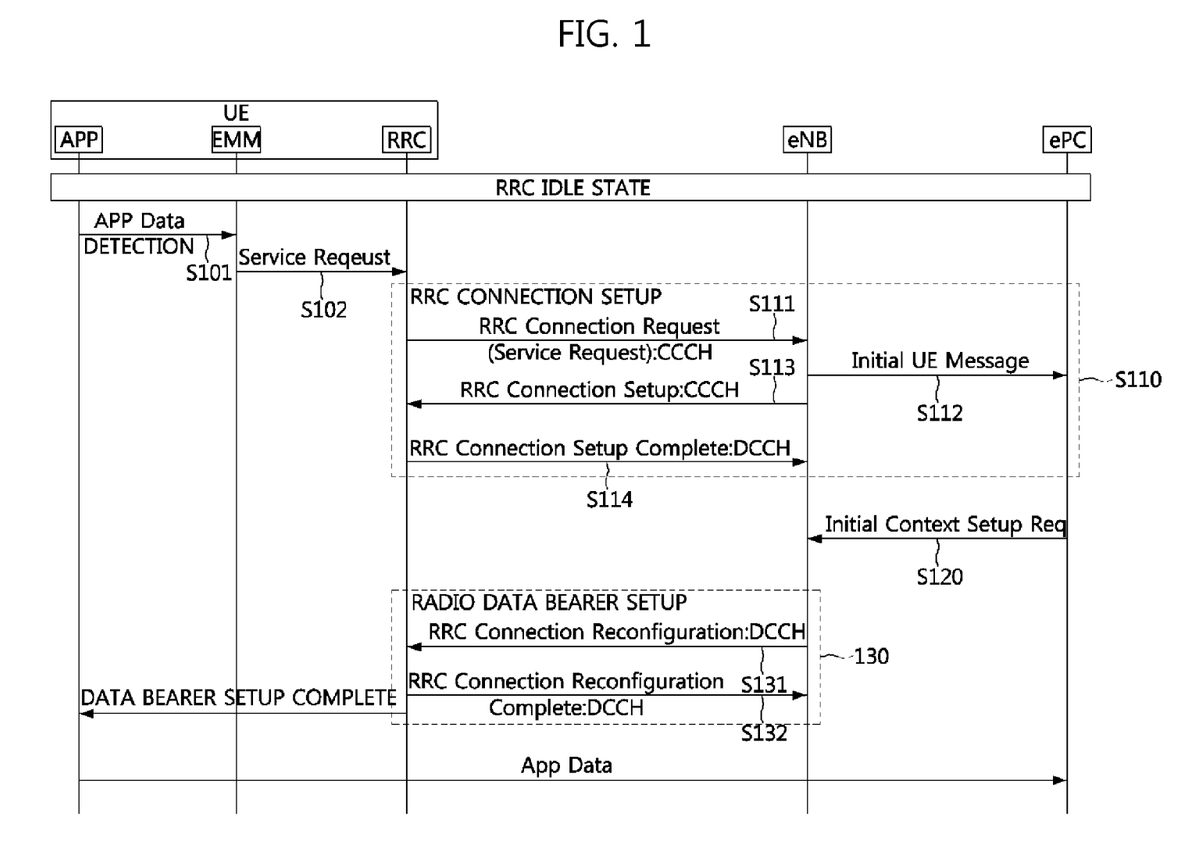
FIG. 1 is a sequence diagram for explaining an uplink packet transmitting process in a conventional 3GPP LTE/LTE-advanced system.

FIG. 1 is a sequence diagram for explaining an uplink packet transmitting process in a conventional 3GPP LTE/LTE-advanced system.

Referring to FIG. 1, when an application data management block of a terminal (user equipment (UE)) detects an uplink packet, the application data management block notifies an EMM block of the detection of the uplink packet (S101). The EMM block transmits a service request message to an RRC block (S102), so that an RRC connection setup process (S110) starts.

Thereafter, a DRB is generated through an RRC reconfiguration message (S120). When this process is completed, an application data management block can transmit uplink data to a network side.

However, when the terminal transmits a small amount of uplink data as in machine-to-machine (M2M) communication which is being studied in the IEEE or machine-type communication (MTC) which is being studied in 3GPP, particularly, in the case of an MTC terminal that performs only uplink data transmission once without receiving downlink data, it is very inefficient to perform all of the processes illustrated in FIG. 1. In addition, when many M2M terminals or MTC terminals request a connection at the same time, it is difficult to cope with an increase in a load, and thus the resolution of this problem is required.

SUMMARY

Accordingly, example embodiments of the present invention are provided to substantially obviate one or more problems due to limitations and disadvantages of the related art.

Example embodiments of the present invention provide a method of transmitting uplink data at a terminal, which is capable of reducing a data transmission time and process in a 3GPP LTE-Advanced system, allowing an efficient use of radio resources, and minimizing a network load occurring when a plurality of terminals are connected.

Example embodiments of the present invention also provide a method of receiving uplink data at a base station, which is capable of reducing a data transmission time and process in a 3GPP LTE-Advanced system, allowing an efficient use of radio resources, and minimizing a network load occurring when a plurality of terminals are connected.

Example embodiments of the present invention also provide a method of receiving uplink data at a packet core network component, which is capable of reducing a data transmission time and process in a 3GPP LTE-Advanced system, allowing an efficient use of resources, and minimizing a network load occurring when a plurality of terminals are connected.

In some example embodiments, a method of transmitting uplink data at a terminal includes detecting uplink data to be transmitted, determining whether or not uplink data transmission is necessary only once, transmitting a service request message including information instructing that a data radio bearer not be generated when it is determined that uplink data transmission is necessary only once, starting a radio resource control (RRC) connection setup process, and performing the uplink data transmission once using a signaling radio bearer without generating the data radio bearer with reference to the information instructing that the data radio bearer not be generated, during the RRC connection setup process, when it is determined that uplink data transmission is necessary only once.

The service request message including the information instructing that the data radio bearer not be generated may be a service request message transferred from an enhanced mobility management (EMM) functional block of the terminal to an RRC functional block.

The information instructing that the data radio bearer not be generated may be configured to be transferred by a value of a field configured with at least one bit included in the service request message.

The performing of the uplink data transmission may include including the uplink data to be transmitted in an RRC connection setup complete message and transmitting the RRC connection setup complete message, during the RRC connection setup process.

The performing of the uplink data transmission may include transmitting an RRC connection request message including the service request message to a base station eNB, receiving an RRC connection setup message, and including the uplink data to be transmitted in an RRC connection setup complete message and transmitting the RRC connection setup complete message.

In other example embodiments, a method of receiving uplink data at a base station includes receiving a radio resource control (RRC) connection request message from a terminal, determining whether or not the RRC connection request message includes information instructing that a data radio bearer not be generated, transmitting an initial UE message including information informing that a data radio bearer is not to be generated to a packet core network when it is determined that the RRC connection request message includes the information instructing that the data radio bearer not be generated, and receiving data from a terminal using a signaling radio bearer without generating the data radio bearer with reference to the information instructing that the data radio bearer not be generated, during an RRC connection setup process performed by the RRC connection request message, when it is determined that the RRC connection request message includes the information instructing that the data radio bearer not be generated.

The receiving of the data may include receiving data from the terminal through an RRC connection setup complete message during the RRC connection setup process.

In still other example embodiments, a method of receiving uplink data at a packet core network component includes receiving an initial UE message from a base station, Receiving data from the base station through an enhanced mobility management (EMM) application data message without transmitting a message instructing the base station to generate a data radio bearer when the initial UE message includes information instructing that the data radio bearer not be generated, and transmitting a UE context release request message to the base station.

The message instructing the base station to generate the data radio bearer may be an initial context setup request message.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

A term "terminal" used herein may be referred to as a mobile station (MS), user equipment (UE), a user terminal (UT), a wireless terminal, access terminal (AT), a subscriber unit, a subscriber station (SS), a wireless device, a wireless communication device, a wireless transmit/receive unit (WTRU), a moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed or moving point communicating with a terminal, and may be referred to as a Node-B, an evolved Node-B (eNB), a base transceiver system (BTS), an access point (AP), a relay, a femto-cell, or other terms.

Hereinafter, example embodiments of the present invention will be described in detail with reference to the accompanying drawings.

According to the present invention, a user's application data is transmitted in a form included in an RRC connection setup complete message, and thus efficiency of a packet transmitting process increases. Further, when only a small amount of uplink data is desired to be transmitted at once, corresponding information is set to a service request message, and so a DRB need not be additionally generated. Thus, efficiency of radio resource management increases. In addition, since the RRC connection setup complete message is a first dedicated control channel (DCCH) message transmitted from a terminal, there is no restriction on the size compared to a common control channel (CCCH) message, and since retransmission and segmentation are supported, packets can be transmitted flexibly and reliably.

First, a description will be made in connection with the overall flow of a method of transmitting and receiving uplink data according to an embodiment of the present invention.

Figure 2:
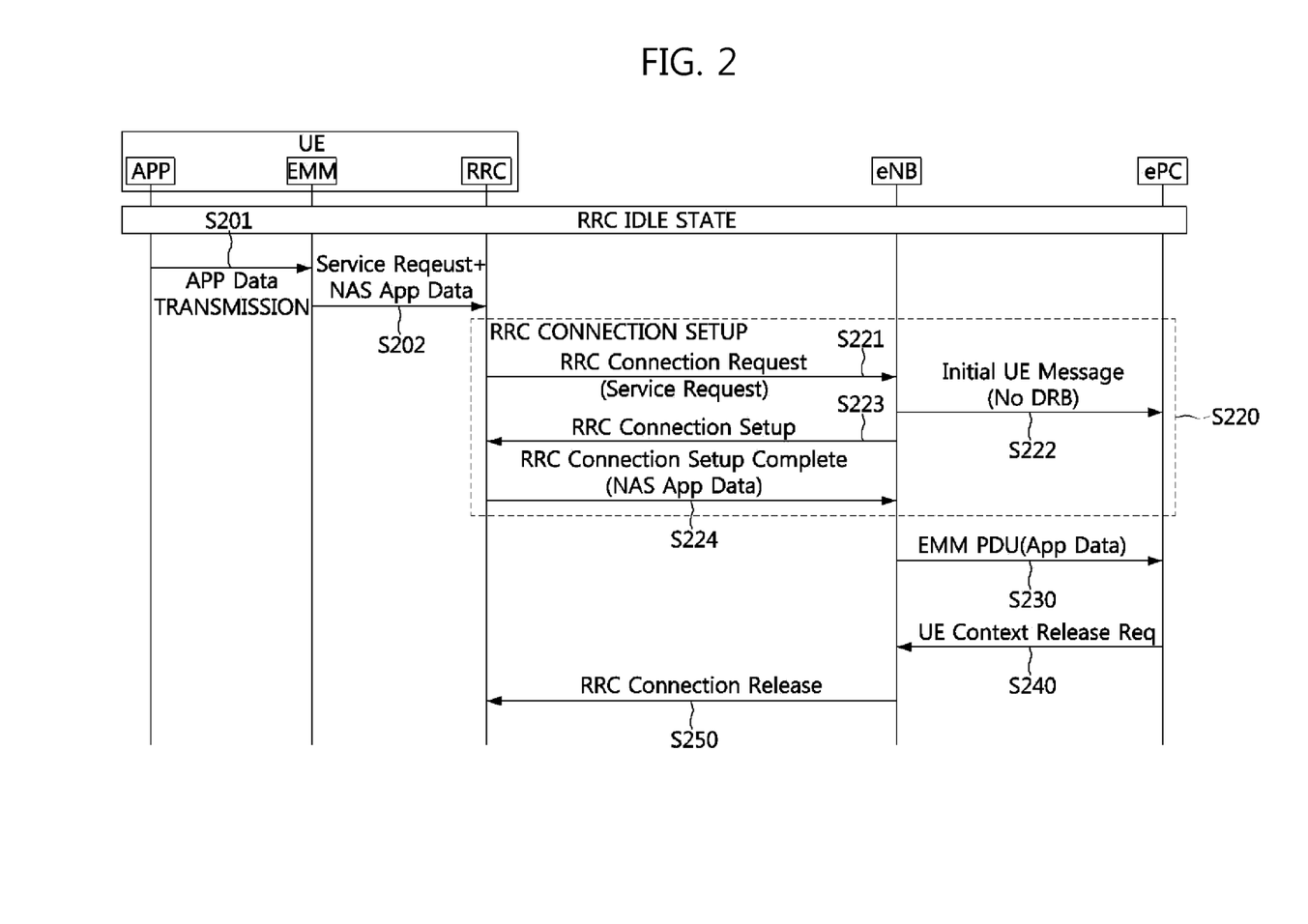
FIG. 2 is a sequence diagram for explaining a method of transmitting and receiving uplink data according to an embodiment of the present invention.

FIG. 2 is a sequence diagram for explaining a method of transmitting and receiving uplink data according to an embodiment of the present invention.

Referring to FIG. 2, a method of transmitting and receiving uplink data according to an embodiment of the present invention may include operation S201 of transferring user data from an application block of a terminal to an EMM block of the terminal, operation S202 of transferring the user data from the EMM block of the terminal to an RRC block, operation S220 of setting up an RRC connection between the RRC block of the terminal and a base station (enhanced Node B (eNB)), operation S230 of transmitting the user data from the base station eNB to a packet core network (enhanced packet core (ePC)), operation S240 of releasing a UE context, and operation S250 of releasing the RRC connection.

The above mentioned operations will be described below in detail.

In operation S201, when the terminal, such as an MTC device, desires to transmit a small amount of uplink data, the application block of the terminal transfers user data to the EMM block of the terminal.

In operation S202, the EMM block of the terminal transfers the user data to the RRC block. At this time, the EMM block transfers the user data to the RRC block together with a service request message. At this time, when small-amount data transmission is necessary only once, information for informing that an additional DRB is not necessary is set to the service request message.

Next, in operation S220, an RRC connection setup process is performed. The RRC connection setup process may include an RRC connection request process (S221), an initial UE message transmitting process (S222), an RRC connection setup process (S223), and an RRC connection setup completion process (S224).

In operation S221, in a state in which the user data (EMM PDU) received from the EMM block is stored, the RRC block starts the RRC connection setup process by transmitting an RRC connection request message, which requests the base station eNB to establish the RRC connection, including the service request received from the EMM block, to the base station.

In operation S222, the base station eNB transmits the initial UE message (service request) to the packet core network (ePC) component, and in operation S223, the base station eNB transmits the RRC connection setup message to the terminal.

In operation S224, when the RRC connection setup message is received, the RRC block of the terminal transmits an RRC connection setup complete message including the stored user data (EMM PDU) to the base station eNB.

The base station eNB receives the RRC connection setup complete message and completes the RRC connection setup process. Thereafter, in operation S230, the base station eNB transmits the uplink data (EMM PDU) included in the RRC connection setup complete message to the packet core network ePC.

Meanwhile, when information for instructing that a DRB not be generated is included the initial UE message, the packet core network ePC component does not transmit an initial context setup request message to the base station eNB, and thus DRB setup is not performed (see operation S120 in the process of transmitting the uplink packet in the conventional 3GPP LTE/LTE-Advanced system illustrated in FIG. 1 for comparison).

The packet core network ePC receives the application data included in the EMM PDU. Thereafter, in operation S240, the packet core network ePC performs a UE context release process to save a radio resource, and in operation S250, the base station performs a process of releasing the RRC connection with the terminal. Through the above process, the RRC connection can be released directly after the uplink data is transmitted, and thus resources for radio connections can be saved.

Individual operations of the above components (the terminal, the base station eNB, and the packet core network ePC) which participate in transmission and reception of the uplink data in the method of transmitting and receiving the uplink data according to the present invention illustrated in FIG. 2 will be described below.

Figure 3:
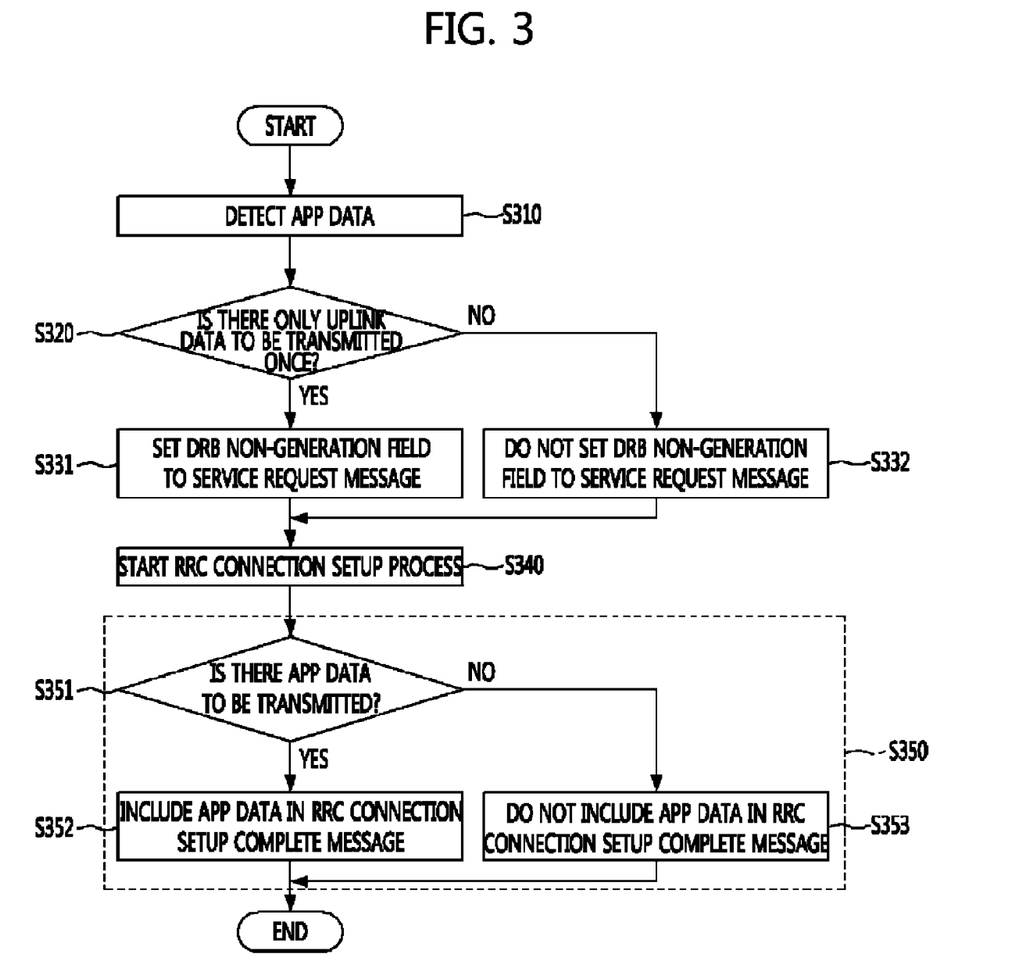
FIG. 3 is a flowchart for explaining a method of transmitting uplink data at a terminal in a method of transmitting and receiving the uplink data according to the present invention.

Method of Transmitting Uplink Data at Terminal According to Embodiment of Present Invention FIG. 3 is a flowchart for explaining a method of transmitting uplink data at the terminal in the method of transmitting and receiving the uplink data according to the present invention.

Referring to FIG. 3, the method of transmitting the uplink data at the terminal may include operation S310 of detecting uplink data to be transmitted, operation S320 of detecting whether or not uplink data transmission is necessary only once, operation S331 of transmitting a service request message including information instructing that a DRB not be generated when it is determined that uplink data transmission is necessary only once, operation S340 of starting an RRC connection setup process, and operation S350 of performing uplink data transmission once using an SRB without generating a DRB with reference to the information instructing that a DRB not be generated, during the RRC connection setup process, when it is determined that uplink data transmission is necessary only once.

First, in operation S310, the uplink data to be transmitted is detected when the application block of the terminal transfers the uplink data to be transmitted to the EMM block of the terminal. The terminal may be a terminal that intermittently transmits a small amount of data like an MTC terminal.

In operation S320, the determination as to whether or not uplink data transmission is necessary only once is performed such that the EMM block of the terminal determines whether or not the user data received from the application block is a small amount of data which is intermittently transmitted at a relatively long interval due to its attributes. That is, when uplink data transmission is necessary only once, the user data transferred from the application block of the terminal is not data having a consecutive stream, but a small amount of data, that is, data having integration in itself.

When the EMM block determines that uplink data transmission is necessary only once, in operation S331, the EMM block of the terminal transmits the service request message including the information instructing that the DRB not be generated to the RRC block.

At this time, as the information instructing that the DRB not be generated, an additional information element (IE) having a field of at least one bit may be defined in the service request message, and then transmitted through the service request message. A configuration example of the additional information element will be described later with reference to FIG. 6.

Meanwhile, when the EMM block determines that uplink data transmission is not necessary only once, the process proceeds to operation S332. In operation S332, the EMM block may transmit the same message as the service request message used in the uplink packet transmitting process of the conventional 3GPP LTE/LTE-Advanced system illustrated in FIG. 1 to the RRC block. Alternatively, the information instructing that the DRB not be generated, which is included in the service request message described in operation S331, may be set in reverse to operation S331, and then transmitted. For example, when the information instructing that the DRB not be generated included in the service request message is configured with a field of one bit, information having a field of "1" may represent that the DRB is not to be generated, and information having a field of "0" may represent that the DRB is to be generated. Further, when the additional information element instructing that the DRB not be generated is not included in the service request message, it may represent that the DRB is to be generated.

In operation S331, at the same time when the service request message including the information instructing that the DRB not be generated is transmitted, the EMM block receives the user data from the application block and stores the user data in the RRC block.

Next, in operation S340, the RRC connection setup process starts. The RRC connection setup process may start when the RRC block of the terminal transmits the RRC connection request message to the base station eNB. At this time, the RRC block of the terminal may transmit the service request message received from the EMM block in operation S331, but the user data received from the EMM block in operation S331 may remain in a storage.

Then, in operation S350, during the RRC connection setup process, the RRC block performs uplink data transmission once using an SRB without generating the DRB with reference to the information instructing that the DRB not be generated.

That is, when the RRC connection setup message is received from the base station, the RRC block of the terminal includes the stored user data received from the EMM block in operation S331 in the RRC connection setup complete message, and then transmits the RRC connection setup complete message to the base station eNB.

Here, an operation of the base station performed at this time is described below for reference. In operation S340 of starting the RRC connection setup process, the base station eNB refers to the information instructing that the DRB not be generated included in the RRC connection request message received from the terminal, and transmits the initial UE message including information instructing that the DRB not be generated to the packet core network ePC. The packet core network ePC checks the information instructing that the DRB not be generated included in the initial UE messages, and does not transmit the initial context setup request message to the base station eNB, so that DRB setup is not performed (see operation S222 of FIG. 2 and operations S112 and S120 of FIG. 1 for comparison).

Figure 4:
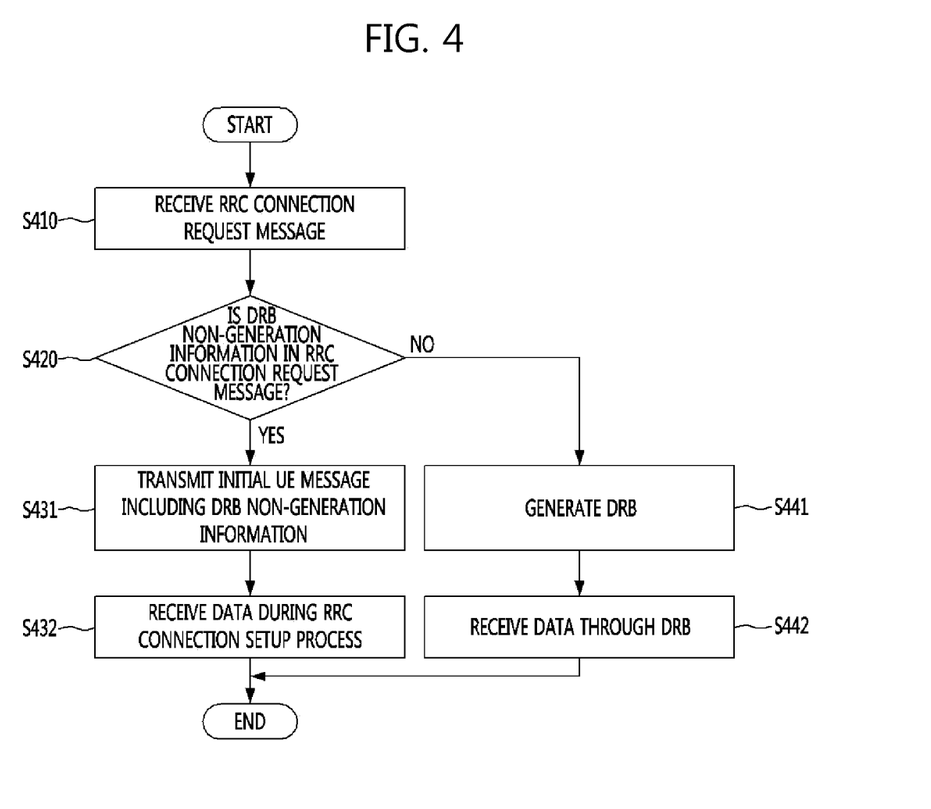
FIG. 4 is a flowchart for explaining a method of receiving uplink data at a base station in a method of transmitting and receiving the uplink data according to the present invention.

Method of Receiving Uplink Data at Base Station Side According to Present Invention FIG. 4 is a flowchart for explaining a method of receiving uplink data at the base station in the method of transmitting and receiving the uplink data according to the present invention.

Referring to FIG. 4, the method of receiving the uplink data at the base station may include operation S410 of receiving the RRC connection request message from the terminal, operation S420 of determining whether or not the RRC connection request message includes the information instructing that a DRB not be generated, operation S431 of transmitting the initial UE message including the information for informing that the DRB is not to be generated to the packet core network ePC when the RRC connection request message includes the information instructing that a DRB not be generated, and operation S432 of receiving the data from the terminal using the SRB without generating the DRB with reference to the information instructing that the DRB not be generated during the RRC connection setup process performed by the RRC connection request message when the RRC connection request includes the information instructing that the DRB not be generated.

First in operation S410, the RRC connection request message is received from the terminal.

Next, in operation S420, it is determined whether or not the RRC connection request message received in operation S410 includes the information instructing that the DRB not be generated.

That is, the RRC connection request message received from the terminal may be configured to include the information instructing that the DRB not be generated, which is added and transmitted by the terminal in operation S340 of starting the RRC connection setup process described with reference to FIG. 3.

For example, when the information instructing that the DRB not be generated included in the RRC connection request message is configured with a field of one bit, a field having a value of "1" may represent that the DRB is not to be generated, and a field having a value of "0" may represents that the DRB is to be generated. Alternatively, whether or not an instruction that the DRB not be generated is given may be determined depending on the presence and absence of the field (additional information element) of the RRC connection request message in which the information instructing that the DRB not be generated is recorded.

When it is determined in operation S420 that the RRC connection request received in operation S410 includes the information instructing that the DRB not be generated, in operation S431, the initial UE message including information for informing that the DRB is not to be generated is transmitted to the packet core network ePC.

In this case, similarly to the RRC connection request message, a field (an information element) of at least one bit having a value of "1" or "0" instructing that the DRB not be generated or that the DRB be generated may be defined in the initial UE message and then transmitted. Alternatively, an instruction that the DRB not be generated may be given to the packet core network by the presence and absence of the field (additional information element) of the initial UE message in which the information instructing that the DRB not be generated is recorded.

When it is determined in operation S420 that the RRC connection request message received in operation S410 includes the information instructing that the DRB not be generated, in operation S432, the base station receives the data from the terminal using the SRB without generating the RDB with reference to the information instructing that the DRB not be generated during the RRC connection setup process performed by the RRC connection request message.

At this time, the base station may receive the data from the terminal through the RRC connection setup complete message, during the RRC connection setup process, without generating the DRB.

When it is determined in operation S420 that the RRC connection request message received in operation S410 does not include the information instructing that the DRB not be generated, the process proceeds to operation S441. In this case, similarly to the uplink packet transmitting process of the conventional 3GPP LTE/LTE-Advanced system illustrated in FIG. 1, in operation S441, the DRB is generated, and in operation S442, the uplink data transmitted from the terminal is received through the generated DRB.

Figure 5:
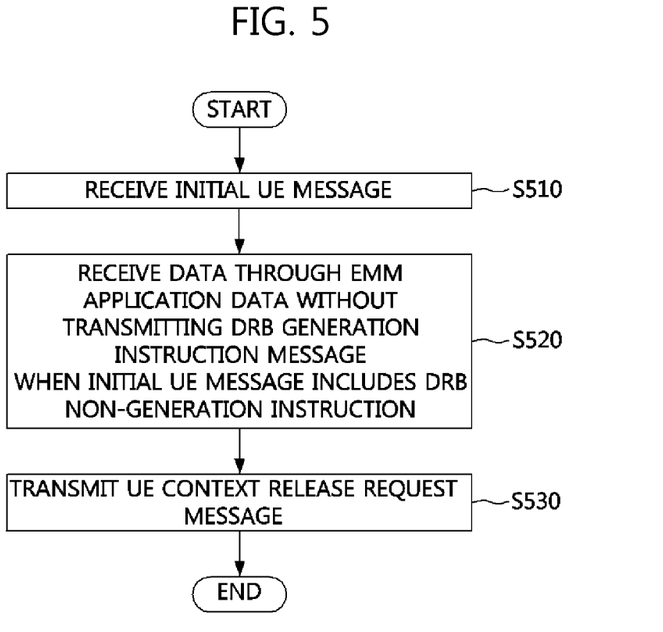
FIG. 5 is a flowchart for explaining a method of receiving uplink data at a core network component in a method of transmitting and receiving the uplink data according to the present invention.

Method of Receiving Uplink Data at Packet Core Network Component According to Present Invention FIG. 5 is a flowchart for explaining a method of receiving uplink data at the core network component in the method of transmitting and receiving the uplink data according to the present invention.

Referring to FIG. 5, the method of receiving the uplink data at the core network component may include operation S510 of receiving the initial UE message from the base station eNB, operation S520 of receiving data from the base station eNB through an EMM application data message without transmitting a message instructing the base station eNB to generate the DRB when the initial UE message includes the information instructing that the DRB not be generated, and operation S530 of transmitting the UE context release request message to the base station eNB.

First, in operation S510, the initial UE message is received from the base station eNB. Operation S510 corresponds to operation S222 described with reference to FIG. 2.

At this time, the initial UE message may include the information instructing that the DRB not be generated. As the information instructing that the DRB not be generated, a field (an information element) of at least one bit having a value of "1" or "0" instructing that the DRB not be generated or that the DRB be generated may be defined in the initial UE message and then transmitted. Alternatively, an instruction that the DRB not be generated may be given to the packet core network by the presence and absence of the field (additional information element) of the initial UE message in which the information instructing that the DRB not be generated is recorded.

Next, in operation S520, it is determined whether or not the initial UE message received from the base station in operation S510 includes the information instructing that the DRB not be generated, and when it is determined that the initial UE message includes the information instructing that the DRB not be generated, the message instructing the base station eNB to generate the DRB is not transmitted to the base station eBN, and the data is received from the base station eNB through the EMM application data message.

At this time, the message instructing the base station eNB to generate the DRB may correspond to the initial context setup request message illustrated in FIG. 1. Thus, when it is determined in operation S520 that the initial UE message received from the base station includes the information instructing that the DRB not be generated, unlike the conventional process illustrated in FIG. 1, the initial context setup request message is not transmitted, and thus the DRB is not generated.

Further, in operation S520, the data is received from the base station eNB through the EMM application data message. At this time, the EMM application data received from the base station corresponds to the user uplink data transmitted in a form included in the RRC connection setup complete message from the terminal in operation S352 described with reference to FIG. 4.

Lastly, in operation S530, the UE context release request message is transmitted to the base station eNB.

Next, a description will be made in connection with additional information elements which may be defined in messages used in the method of transmitting and receiving the uplink data according to the present invention.

Figure 6:
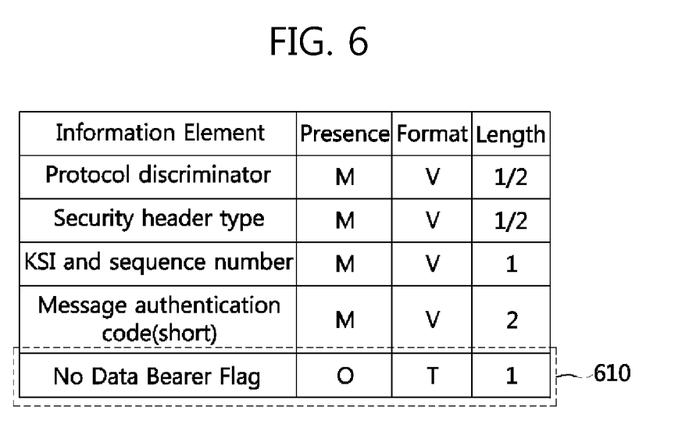
FIG. 6 is a diagram illustrating a data structure for explaining an additional information element included in a service request message for transmission and reception of uplink data according to the present invention

FIG. 6 is a diagram illustrating a data structure for explaining an additional information element included in the service request message for transmission and reception of uplink data according to the present invention.

Referring to FIG. 6, by transmitting the service request message (the message described in operation S202 of FIG. 2) including a flag field ("no data bearer flag") 610 configured with at least one bit (in a configuration illustrated in FIG. 6, it is configured with an optional field of one bit) for instructing that the DRB not be generated, the EMM block of the terminal can instruct the RRC block not to generate the DRB. The service request message illustrated in FIG. 6 may be included in the RRC connection request message (the message described in operation S221) illustrated in FIG. 2 and then transmitted.

At this time, whether or not the DRB is to be generated may be instructed by the field having a value of "1" or "0". Alternatively, whether or not the DRB is to be generated may be instructed by the presence and absence of the field itself.

Figure 7:
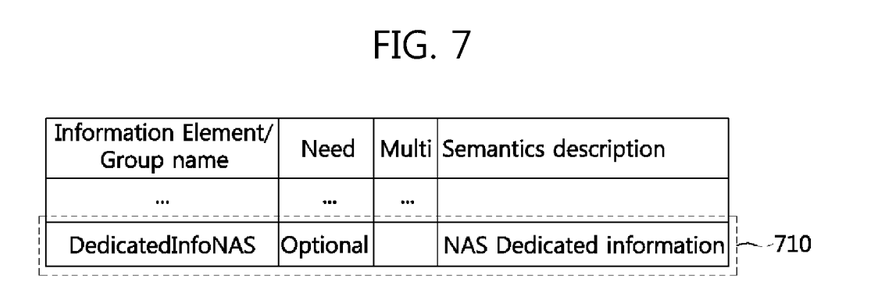
FIG. 7 is a diagram illustrating a data structure for explaining an additional information element included in an RRC connection setup complete message for transmission and reception of uplink data according to the present invention.

FIG. 7 is a diagram illustrating a data structure for explaining an additional information element included in the RRC connection setup complete message for transmission and reception of uplink data according to the present invention.

Referring to FIG. 7, the RRC connection setup complete message may include a field ("dedicatedinforNAS") 710 as the additional information element.

The RRC connection setup complete message is a message (the message described in operation S224 of FIG. 2) used when the terminal transmits the uplink data to the base station eNB, and the uplink data to be transmitted to the base station is included in the RRC connection setup complete message. That is, the uplink data received from the application block and the EMM block is included in the field 710 of the RRC connection setup complete message, and the RRC connection setup complete message including the uplink data is transmitted to the base station.

Figure 8:
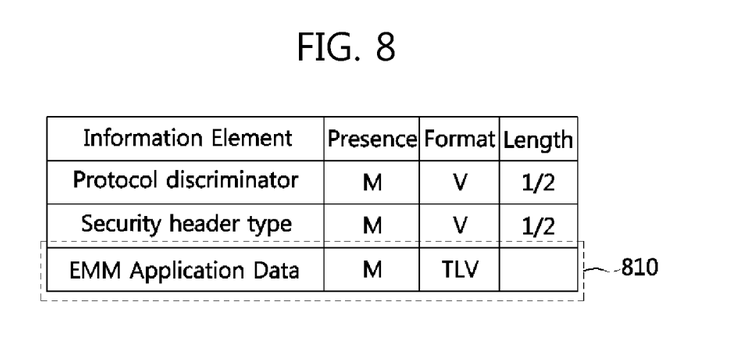
FIG. 8 is a diagram illustrating a data structure for explaining an additional information element included in an EMM application data message for transmission and reception of uplink data according to the present invention.

FIG. 8 is a diagram illustrating a data structure for explaining an additional information element included in the EMM application data message for transmission and reception of uplink data according to the present invention.

Referring to FIG. 8, the EMM application data message is configured to include a field ("EMM application data") 810, and is used when the base station eNB transmits the uplink data to the packet core network ePC component (the message described in operation S230 of FIG. 2).

Using a method of transmitting and receiving uplink data according to the present invention, since uplink data is transmitted in a form included in an RRC connection setup complete message, a data transmission time and process can be significantly reduced in the 3GPP LTE-Advanced system.

Particularly, when a terminal desires to transmit uplink data at once, since an additional process for generating a DRB is not performed, radio resources can be efficiently managed, and a network load occurring when a plurality of terminals are connected can be minimized. In addition, since an RRC connection is released after uplink data is transmitted, resources for radio connections can be saved.

While the example embodiments of the present invention and their advantages have been described in detail, it should be understood that various changes, substitutions and alterations may be made herein without departing from the scope of the invention.

What is claimed is:

1. A method of transmitting uplink data at a terminal, comprising:
    detecting uplink data to be transmitted;
    determining whether or not uplink data transmission is necessary only once;
    transmitting a service request message including information instructing that a data radio bearer not be generated when it is determined that uplink data transmission is necessary only once;
    starting a radio resource control (RRC) connection setup process; and
    performing the uplink data transmission once using a signaling radio bearer without generating the data radio bearer with reference to the information instructing that the data radio bearer not be generated, during the RRC connection setup process, when it is determined that uplink data transmission is necessary only once.

2. The method of claim 1, wherein the service request message including the information instructing that the data radio bearer not be generated is a service request message transferred from an enhanced mobility management (EMM) functional block of the terminal to an RRC functional block.

3. The method of claim 2, wherein the information instructing that the data radio bearer not be generated is transferred by a value of a field configured with at least one bit included in the service request message.

4. The method of claim 1, wherein the performing of the uplink data transmission includes including the uplink data to be transmitted in an RRC connection setup complete message and transmitting the RRC connection setup complete message, during the RRC connection setup process.

5. The method of claim 1, wherein the performing of the uplink data transmission includes:
    transmitting an RRC connection request message including the service request message to a base station (eNB);
    receiving an RRC connection setup message; and
    including the uplink data to be transmitted in an RRC connection setup complete message and transmitting the RRC connection setup complete message.

6. A method of receiving uplink data at a base station, comprising:
    receiving a radio resource control (RRC) connection request message from a terminal;
    determining whether or not the RRC connection request message includes information instructing that a data radio bearer not be generated;
    transmitting an initial UE message including information informing that a data radio bearer is not to be generated to a packet core network when it is determined that the RRC connection request message includes the information instructing that the data radio bearer not be generated; and
    receiving data from a terminal using a signaling radio bearer without generating the data radio bearer with reference to the information instructing that the data radio bearer not be generated, during an RRC connection setup process performed by the RRC connection request message, when it is determined that the RRC connection request message includes the information instructing that the data radio bearer not be generated.

7. The method of claim 6, wherein the receiving of the data includes receiving data from the terminal through an RRC connection setup complete message during the RRC connection setup process.

8. A method of receiving uplink data at a packet core network component, comprising:
    receiving an initial UE message from a base station (eNB);
    receiving data from the base station through an enhanced mobility management (EMM) application data message without transmitting a message instructing the base station to generate a data radio bearer when the initial UE message includes information instructing that the data radio bearer not be generated; and
    transmitting a UE context release request message to the base station.

9. The method of claim 8, wherein the message instructing the base station to generate the data radio bearer is an initial context setup request message.

* * * * *